Dec. 25, 1956    J. M. CHAMBERS ET AL    2,775,179
HITCH MECHANISM FOR TRACTOR-DRAWN IMPLEMENTS
Filed April 10, 1952    2 Sheets-Sheet 1

INVENTORS
JOHN M. CHAMBERS
JAMES C. McNEICE
BY
Attys.

Dec. 25, 1956 J. M. CHAMBERS ET AL 2,775,179
HITCH MECHANISM FOR TRACTOR-DRAWN IMPLEMENTS
Filed April 10, 1952 2 Sheets-Sheet 2
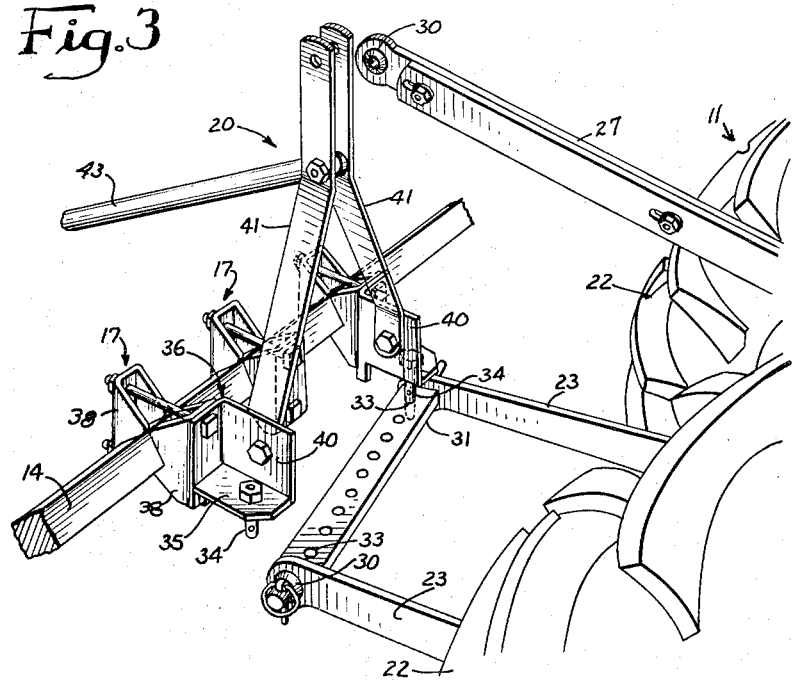
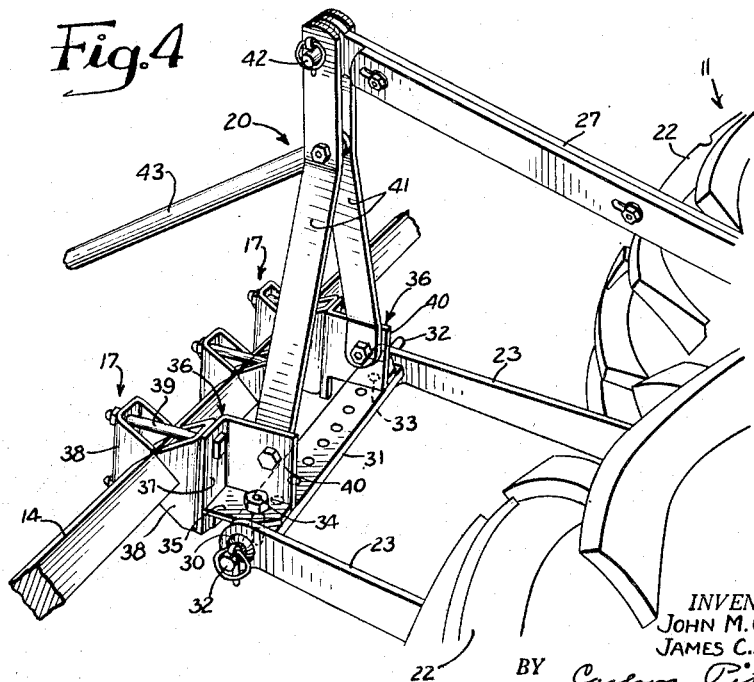
INVENTORS
JOHN M. CHAMBERS
JAMES C. MC NEICE
BY Carlson, Pitzner,
Hubbard & Wolfe
Attys.

United States Patent Office 2,775,179
Patented Dec. 25, 1956

2,775,179

HITCH MECHANISM FOR TRACTOR-DRAWN IMPLEMENTS

John M. Chambers and James C. McNeice, Leamington Spa, England, assignors to Massey-Harris-Ferguson (Sales) Limited, a British company Application April 10, 1952, Serial No. 281,644

Claims priority, application Great Britain April 14, 1951

2 Claims. (Cl. 97—47.14)

The invention relates to hitch mechanisms for attaching agricultural and comparable implements to tractors, and more especially to hitch mechanisms for attaching implements to tractors equipped with a three-element hitch linkage including two laterally spaced draft links which are adapted to be raised or lowered by a power unit on the tractor.

A general object of the invention is to provide an improved hitch mechanism of the above general character which materially simplifies the task of attaching an implement to the tractor draft links.

A more specific object is to provide a hitch mechanism including connecting elements respectively carried by the implement and the tractor draft links and adapted to be operatively interconnected by vertical movement of the draft links.

Another object is to provide a hitch mechanism of the type above referred to in which the operative interconnection of the connecting elements is effected through the engagement of laterally spaced projections on one element in complementary spaced recesses in the other element.

Still another object is to provide a hitch mechanism utilizing connecting elements having complementary laterally spaced projections and recesses adapted to be engaged by the vertical movement of one element relative to the other and having the projections and recesses spaced vertically with respect to each other so that one projection may be initially engaged in a recess to define a pivot about which the implement can be swung by fore-and-aft movements of the tractor to align the other projection and recess for engagement.

Other objects and advantages of the invention will become apparent from the following detailed description of the preferred embodiment illustrated in the accompanying drawings in which:

Fig. 3 is a perspective view of the hitch mechanism together with parts of the implement and tractor, showing the elements of the mechanism in process of being engaged; and Fig. 4 is a perspective view of the hitch mechanism similar to Fig. 3 but showing the elements of the mechanism fully engaged.

Figure 1:
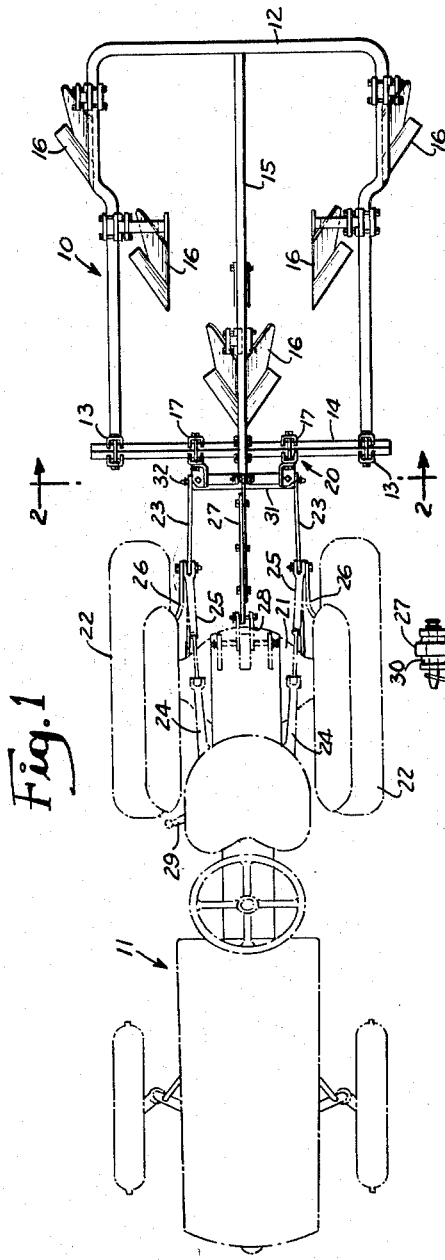
Fig. 1 is a plan view of a tractor and an implement connected by a hitch mechanism embodying the features of the invention.

While the invention is susceptible of various modifications and alternative constructions, a preferred embodiment has been shown in the drawings and will be described herein in some detail. It is to be understood, however, that there is no intention to limit the invention to the specific form disclosed, the intention being, on the contrary, to cover all modifications and alternative constructions falling within the spirit and scope of the invention as expressed in the appended claims. It is also to be understood that the invention is not limited to use with the particular tractor and implement with which it is shown herein, but is generally applicable to tractors equipped with three-element hitch linkages and with a wide variety of implements designed for attachment to such linkages.

Referring now to Fig. 1 of the drawings, the invention has been shown as employed for connecting an implement 10, in this instance a vineyard plow, to a tractor 11 of well-known type which has been modified by shortening the rear axle to reduce the width of the tread and thus better adapt it for orchard or vineyard use. The invention affords certain definite advantages when used with this type of tractor, but it may also be used to advantage with tractors of normal width either with or without stabilizers for the draft links.

The implement 10 illustrated has a generally U-shaped frame 12 removably but rigidly attached, as by clamps 13, to a transversely disposed tool bar 14 of rectangular cross section. The frame 12 and a central longitudinally disposed frame member 15 rigid therewith carry a plurality of ground working tools 16, the particular character of which is of no concern to the present invention.

Also rigidly mounted on the tool bar 14, as by clamp 17, is one of the connecting elements of the hitch mechanism, indicated generally at 20, by which the implement is attached to the tractor hitch links.

As indicated heretofore, the tractor 11, as shown, has a shortened rear axle and a correspondingly shortened rear axle housing 21 for supporting the rear drive wheels 22. The three-element hitch linkage of the tractor is of the well-known type comprising a pair of laterally spaced draft links 23 universally pivoted at their forward ends on the tractor body below and somewhat forwardly of the tractor rear axle. The draft links 23 are adapted to be raised and lowered by a power unit on the tractor, acting through a rock shaft (not shown) journaled on the tractor body and having crank arms 24 at opposite ends connected with the draft links by drop links 25. To prevent the draft links 23 from fouling the tractor drive wheels, the links in this instance are restrained against lateral movements about their pivots on the tractor by stabilizing bars 26 connected between the respective draft links and suitable brackets provided on the axle housing 21.

Figure 2:
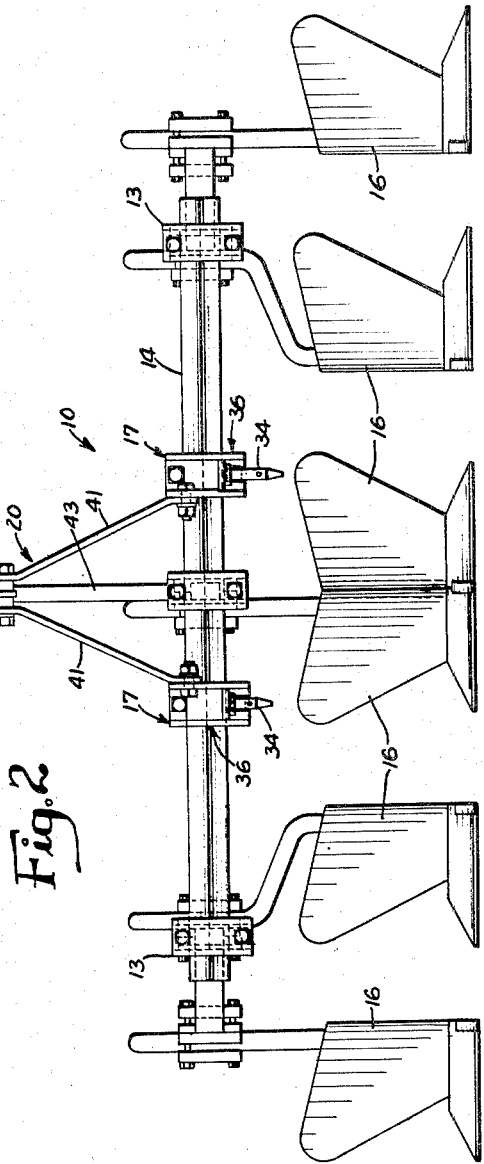
Fig. 2 is a front view of the implement shown in Fig. 1 detached from the tractor.

The third element of the tractor hitch linkage is a rigid link 27 universally pivoted at its forward end to a shackle 28 which, in turn, is pivoted on the rear portion of the tractor body. This link operates in a well-known manner to transmit compression and tension forces from the implement to control mechanism on the tractor for raising or lowering the hitch links to maintain the ground working tools of the implement at a selective working depth determined by the setting of a manually operable controller or quadrant lever 29. Each of the three links of the tractor hitch linkage is provided at its free or trailing end with a universally socketed ball connecting element 30 (Figs. 2 and 3) adapted to receive a connecting pin provided on any of the implements usually connected to the tractor. With the link arrangement above described, the ball elements 30 are disposed in a triangular pattern in a common substantially vertical plane.

Implements intended for attachment to tractors having hitch linkages of the type above described have been provided heretofore with connecting pins disposed horizontally and usually directed outwardly. The attachment of such implements to a tractor is effected by backing the tractor into a position in which the ball elements of the laterally spaced draft links can be slipped over the pins provided for that purpose on the implement. It is rather difficult to position the tractor so that both draft links line up accurately with the connecting pins and, accordingly, it is more or less the usual practice to position the tractor so that one link lines up with its pin and, after connection is made therewith, the implement is pushed or pulled around by hand until it is possible to connect the other link with its pin. This is time-consuming and, in the case of most agricultural implements, requires considerable physical effort.

The difficulty of completing the connections between the tractor draft links and the implement is considerably increased when stabilizing bars are employed, since such bars prevent the draft links from being spread apart sufficiently to clear the pins. In the case of standard width tractors, the freeing of one of the draft links from its stabilizer bars usually allows sufficient swing of the links to complete the connection. With narrow tread tractors on the other hand, freeing of either or both draft links from their stabilizer bars does not help since the tractor drive wheels prevent the draft links from being spread apart far enough to clear the connecting pins. Under such conditions, partial disassembly of the implement must be resorted to in order to complete the connections.

The improved hitch mechanism eliminates the above mentioned and other difficulties encountered in attaching an implement to a tractor with a conventional hitch. This is accomplished by constructing the hitch mechanism 20 in two separable parts, respectively mounted on the tractor and the implement and respectively provided with complementary projections and recesses adapted to be operatively engaged by upward movement of the tractor mounted part. In the exemplary hitch mechanism, the tractor mounted part is in the form of an elongated flat bar 31 having outwardly projecting pins 32 at opposite ends for reception in the connecting elements 30 at the free ends of the draft links 23. The bar 31, when installed, becomes a semi-permanent part of the tractor hitch linkage; that is, it may be removed if necessary, but ordinarily is left in place for selective attachment to any one of a series of implements equipped for connection therewith.

In the particular form of the mechanism illustrated, the bar 31 is formed with laterally spaced recesses 33, and complementary spaced projections in the form of pins 34, adapted to engage in the recesses, are provided on the implement carried part of the hitch mechanism. As shown in Figs. 3 and 4, the pins 34 are rigidly mounted in vertically depending position on horizontal flanges 35 of a pair of brackets 36 suitably attached to the clamps 17. As herein shown, each of the brackets 36 has an upright back wall portion 37 adapted to abut against the front face of one of the two members 38 of the clamp 17 and this wall portion and the clamp members are apertured to receive through-bolts 39 which secure the parts together and frictionally clamp the members 38 on the tool bar 14.

The brackets 36 also include upright side wall portions 40 to which are bolted or otherwise secured the two upright members 41 of an A-frame adapted for connection with the upper link 27 of the tractor hitch linkage. The members 41 are preferably bent so that their intermediate portions converge upwardly and present parallel upper end portions closely spaced to receive the free end of the link 27. The spaced end portions of the members are apertured to receive a pin 42 engaging the ball connecting element 30 of the link. A brace bar 43, connected between the upright members 41 and the frame member 15 of the implement, holds the A-frame rigid. With this arrangement the links of the tractor hitch linkage act to hold the implement substantially horizontal in its vertical movements with the linkage. Additionally, ground reaction on the ground working tools of the implement is transmitted through the A-frame and top link 27 to the control mechanism of the tractor to regulate the working depth of the implement.

Preferably, although not necessarily, one of the connecting pins 34 is made substantially longer than the other so that it can be engaged in its recess 33 while the end of the companion pin is still in a position to clear the bar 31. Accordingly, in attaching the implement to the tractor it is only necessary to line up one recess with the long pin and raise the hitch linkage sufficiently to engage the end of that pin in the recess. A pivotal connection is thus provided as shown in Fig. 3 about which the implement can swing as the tractor is run ahead or backed. In the particular set-up shown in the drawing, backing of the tractor will swing the implement around so as to carry the other pin 34 forwardly. When that pin is aligned with its recess 33, the bar 31 is raised further to complete the connection as shown in Fig. 4. After connection of the two parts of the hitch as above described, the top link 27 is connected in the usual way by insertion of the pin 42 through the apertures in the A-frame members and the connecting element in the link. It will be appreciated that the pins 34 as well as other connecting pins used in the hitch mechanism are formed with cross holes for reception of the usual cotter pins or like fasteners which prevent accidental disengagement of the parts.

It will be apparent from the foregoing that the invention provides a hitch mechanism of novel and advantageous construction which materially simplifies the attachment of an implement to a tractor equipped with a power-operated hitch linkage. By providing a hitch mechanism comprising separable parts mountable respectively on the implement and the tractor hitch linkage and equipped with interengageable projections and recesses, the connection may be effected by simply backing the tractor up to the implement so as to align the cooperating projections and recesses, and then raising the tractor hitch linkage to engage the projections in the recesses. Alignment of the projections and recesses is facilitated by spacing one set of projections and recesses relative to the other so that one engages before the other and establishes a pivot about which the implement may swing relative to the tractor. By moving the tractor forwardly or rearwardly, the implement may be swung around that pivot to line up the other set of projections and recesses and the connection is then completed by further raising the tractor hitch linkage. Thus the more difficult part of the implement attaching process can be effected with a minimum of effort on the part of the tractor operator and without requiring him to dismount from the tractor. The connection of the top link of the tractor hitch linkage to the A-frame on the implement is effected in the usual manner.

The improved hitch mechanism is simple and rugged in construction, and it may be quickly and easily attached to any type of implement without requiring any changes or modifications of the implement structure. The mechanism is especially advantageous when used with tractors having their draft links restrained by stabilizer bars, although it is in no wise limited to such use.

We claim as our invention:

1. A hitch mechanism for attaching an implement to a tractor having laterally spaced draft links trailingly universally pivoted on its rear end portion and having a power unit for raising and lowering the links, an elongated flat bar adapted to be connected across the trailing ends of the draft links for universal pivotal movement relative thereto, said bar having a pair of laterally spaced recesses, a pair of vertically disposed pins rigidly mounted on the implement and spaced apart to register with and engage in the respective recesses in said bar as the latter is raised by the tractor draft links, one of said pins being longer than the other so as to engage in its recess before engagement of the other pin whereby to define a pivot about which the implement can swing as a consequence of fore-and-aft movement of the tractor and thus align the other pin with the recess provided for its reception.

2. A hitch mechanism for attaching an implement to a tractor having laterally spaced draft links trailingly universally pivoted on its rear end portion and having a power unit for raising and lowering the links, an elongated flat bar adapted to be connected across the trailing ends of the draft links for universal pivotal movement relative thereto, said bar having a pair of laterally spaced recesses, a pair of vertically disposed pins rigidly mounted on the implement and spaced apart to register with and engage in the respective recesses in said bar as the latter is raised by the tractor hitch linkage, one of the pins having its projecting end positioned so as to engage in its associated recess before engagement of the other pin upon upward movement of said bar whereby to establish a pivot about which the implement can swing in response to fore-and-aft movements of the tractor, said other pin being engaged in its recess upon further raising of said bar by the tractor draft links.

References Cited in the file of this patent

UNITED STATES PATENTS

| | | |
|---|---|---|
| 1,493,970 | Dubois | May 13, 1924 |
| 2,322,342 | Bunn | June 22, 1943 |
| 2,347,898 | Ferguson | May 2, 1944 |
| 2,515,637 | Dooley et al. | July 18, 1950 |
| 2,567,738 | Silver et al. | Sept. 11, 1951 |
| 2,618,211 | Fraga | Nov. 18, 1952 |
| 2,713,298 | Lindeman et al. | July 19, 1955 |

FOREIGN PATENTS

| | | |
|---|---|---|
| 225,304 | Switzerland | Apr. 16, 1943 |